INVENTORS
RAYMOND T. WRIGHT
JAMES E. YOUNG
BY
ATTORNEYS

United States Patent Office 3,437,020
Patented Apr. 8, 1969

3,437,020
MICROFILM TITLING APPARATUS
Raymond T. Wright, Penfield, and James E. Young, Pittsford, N.Y., assignors to Xerox Corporation, Rochester, N.Y., a corporation of New York
Filed July 5, 1966, Ser. No. 562,871
Int. Cl. G03b 17/53
U.S. Cl. 95—1.1                                 5 Claims This invention relates to xerographic apparatus for reproducing information onto web materials and more specifically to titling or coding onto materials, such as microfilm and the like.

It is common to store information on web materials, such as, microfilm and the like, for subsequent retrieval and readout. In fact, most libraries have reading devices for the purpose of reading out information that has been stored in the form of microfilm mounts or film reels. To select a desired film frame or frames for viewing from the reel, it is usually necessary to have some frame identification system, such as, frame numbering whereby an operator may have a ready reference for manipulating the film transport of the reading device.

Generally speaking, the film reels described above are perforated for sprocket transport and desirably are numbered or otherwise coded along the film edge adjacent the sprocket holes so as not to interfere with the frame image. As can readily be appreciated, the film area available for locating the identification code is extremely limited necessitating a high order of accuracy in effecting registration without overlapping onto the image or sprocket hole areas.

Heretofore microfilm titling has been accomplished primarily by stamping the film with printing characters as the film is transported past a printing station on a conveyor transport. This technique is time consuming and requires laborious adjustments to insure proper registration between the printing characters and the prearranged marking areas on the microfilm. For these as well as other reasons it has not proven entirely satisfactory.

In accordance with the present invention there is provided a novel apparatus by which prearranged marking areas along the web length can be titled or otherwise identified as by numbering, simply and rapidly within extremely fine tolerances and without subjecting the web to undue distortion or other damage. Generally speaking, the invention is accomplished by transferring a developed xerographic image onto the web which has a positive feed that is sychronized with each xerographic exposure. More than this, the apparatus can interchangeably accommodate microfilm of different sizes without sacrificing any accuracy for maintaining registration of the titling information with respect to the prearranged marking areas thereon.

It is therefore an object of this invention to provide an improved apparatus for titling prearranegd marking areas on web materials.

Another object of this invention is to provide novel apparatus for titling sprocket aperatured web materials, such as, microfilm and the like, along the edges thereof within accurately defined limits.

A further object of this invention is to provide novel apparatus capable of titling prearranged marking areas on microfilm automatically and continuously whereby image frames contained on the microfilm may be readily identified.

A still further object of the invention is to provide a single apparatus capable of interchangeably titling microfilm rolls of varying frame sizes along the edges thereof in a manner more simply and accurately than used heretofore.

For a better understanding of the invention, as well as other objects and further features thereof, reference is had to the following detailed description of the invention to be read in connection with the accompanying drawings wherein.

Figure 1:
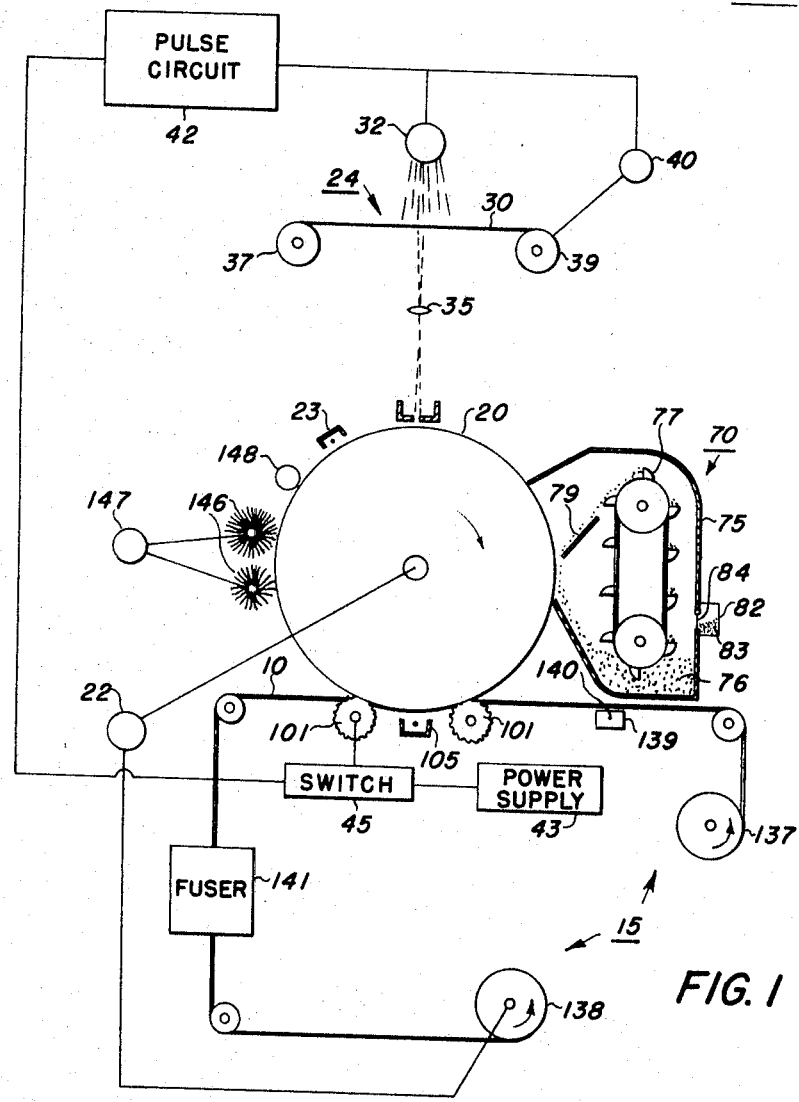
FIG. 1 illustrates schematically an embodiment of the titling apparatus in accordance with the present invention.

In FIG. 1 there is shown apparatus for titling a sprocket aperatured web 10 such as, microfilm or the like, supported on a transport assembly generally designated 12. Titling information originates from a master film 15 and is xerographically processed as disclosed in U.S. Patent 3,186,838. A band 16 of photoconductive material, such as vitreous selenium (see FIG. 3), is fixed to a drum 20 rotatably mounted on a shaft 21 to rotate in a direction indicated by the arrow thereby causing the photoconductive band to sequentially pass a plurality of xerographic processing stations including a transfer station adjacent web 10 where transfer of titling information is effected. Drum 20 is rotated at a constant rate through the drive action of a synchronous motor 22 which is also connected to the drive of transport assembly 12 for web 10.

To place an initial charge on photoconductive band 16 there is provided a charging apparatus 23, which may be a corona discharge array of one or more corona discharge electrodes that extend transversely across the band and are energized from a high potential source, as described in Walkup Patent 2,777,957.

Next subsequent in the path of motion of drum 20 is an exposure station generally designated 24 at which the reference titling information is contained. The exposure station comprises a master film strip 15, a flash lamp 32, and a lens 35 which together serve to project titling information onto photoconductive band 16. Film strip 15 is supported on a supply reel 37 and a takeup reel 39 which is driven by a stepping motor 40 to advance the film strip one frame after each exposure. A pulse circuit 42 emits electrical pulses for triggering both lamp 32 and motor 40. Since the exposure is very brief as, for example, about five microseconds and motor 40 has an inherent delay in driving film strip 15, there is no likelihood in the master film strip moving during the flash exposure interval. Pulse circuit 42 is connected to power supply 43 via a switch 45 that is actuated intermittently by transport assembly 12 as will become more apparent. This operation of switch 45 in conjunction with web transport assembly 12 to be described hereinafter provides synchronization of the exposure with the advance of the prearranged marking areas on web 10 to effect the recording of information thereon.

Adjacent exposure station 24 is a developing station generally designated as 70 at which there is positioned a developer housing 75 including a lower sump portion for accumulating developer material 76. Developer material 76 comprises powder or toner mixed with a granular "carrier" material, as described in U.S. Patent 2,618,551 to Walkup. A bucket-type conveyor 77 having a suitable driving means is used to carry the developing material to the upper part of the developer housing where it is cascaded down over a hopper chute 79 onto band 16. As the developer material is cascaded over the recording drum, toner particles are pulled away from the carrier component of the developer material and deposited onto the charged drum areas to form powder images thereof, while the partially denuded carrier particles pass off the drum into the developer housing sump. As toner powder images are formed, additional toner particles must be supplied to the developer material in proportion to the amount of toner deposited on the drum. For this purpose there is provided a container 82 for toner 83 to be added to the developing material as needed, the toner being added at a rate determined by control gate 84.

Next subsequent in the path of drum 20 is the transfer station where the developer xerographic image is transferred from drum 20 to web 10. In accordance with the present invention, both longitudinal and horizontal registration is maintained between web 10 and drum 20 by a pair of sprocket members 101 which engage both the web and recording drum as will be more fully understood hereinafter. Transfer of the image to the web is effected by a second corona charging device 105 similar to charging device 23 to electrostatically attract the toner image from the surface of the recording drum to web 10.

Web 10 on which the coding information is to be applied is advanced from a supply spool 137 to a takeup spool 138 passing first an alignment station 139. When loading, alignment of the initial marking area on web 10 with a benchmark 140 insures proper registration thereafter between the drum portion at exposure station 24 and its arrival at the transfer station coincident with the areas to be marked on moving web 10. Thereafter, as web 10 is transported over sprocket members 101, there is caused a predetermined actuation of switch 45 whereby the exposure at exposure station 24 is synchronized with the movement of web 10. Thereafter, web 10 is transported through a fuser 141 whereby the developed and transferred xerographic powder image is permanently fixed thereto. Any suitable fixing mode may be used, such as, by vapor as described in U.S. Patent 3,132,047, or by the application of heat. Takeup spool 138, which is coupled to motor 22, is provided with a slip clutch to maintain proper tensioning of web 10 as is well known to those skilled in the art.

The next and final station in the apparatus is a drum cleaning and discharge station whereat any toner remaining on the recording drum after transfer is removed by rotating brushes 146 driven by a motor 147 and the drum is flooded with light by illumination from lamp 148 to cause dissipation of any residual electrical charge.

Figure 2:
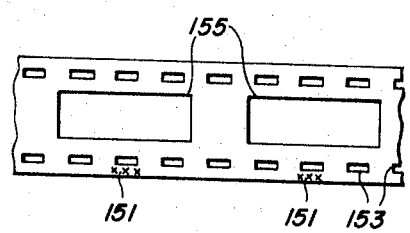
FIGS. 2 and 2A are plan views of microfilm strips which have been titled in accordance with the present invention.

FIG. 2 shows a portion of web 10 in the form of sprocket apertured microfilm which has been titled along the edge thereof according to the present invention. The microfilm may be any conventional size, as, for example, 16 mm., 35 mm. and 70 mm. Titling information 151 in the margin outside sprocket apertures 153 identifies each film frame image 155. As can readily be appreciated, it is of primary importance that the recorded titling information 151, be accurately registered in the area available for this purpose. Thus where titling information 151 comprises numerals which identify film frames, any slippage present between web 10 and drum 20 could result in partial or compete failure to record and ultimately in frame identification error. The reason for this is that of horizontal slippage were permitted it could cause the numbers to miss the film entirely or at least partially overlap the apertures 153 and longitudinal slippage especially when compounded or accumulated on long film rolls, and could effect a reference title being associated with a frame other than that intended.

Figure 2A:
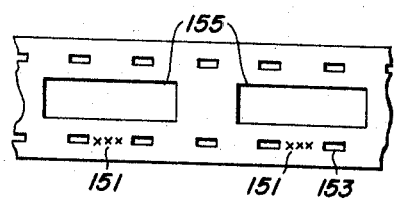

FIG. 2A illustrates a second embodiment in which sprocket apertures 153 are sufficiently spaced apart to enable titling information 151 to be recorded intermediate sprocket apertures 153 instead of in the outside margin. The spacing of the sprocket apertures in this figure is on the order of $3/10$ inch which is typical for 16 mm. film while that illustrated in FIG. 2 is $3/16$ inch which is representative of 35 mm. and 70 mm. films. Where the film frames are sufficiently long as in the case of 70 mm. film, titling information 151 may also be used to similarly designate half frames.

Figure 3:
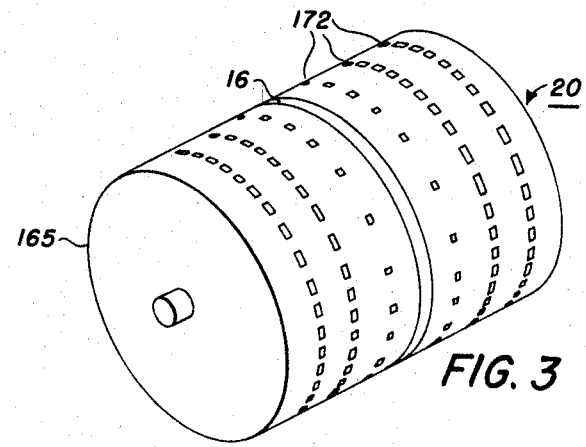
FIG. 3 is an isometric view of the recording drum in the apparatus of FIG. 1.

In FIG. 3 there is shown in exploded view of drum 20 which comprises a generally cylindrical shell 165 around which is fixed photoconductive band 16 applied as by coating as is known in the art. Band 16 is aligned with the xerographic stations previously described so that upon rotation of drum 20 on shaft 21, the band is advanced sequentially past the stations to effect recording of the titling information supplied from master film 15.

Arranged on each side of band 16 about the periphery of cylindrical element 165 are openings 172 which are formed in parallel spaced apart rings. The peripheral spacing of openings 172 in each ring corresponds to the linear spacing of the sprocket apertures 153 for a particular size web 10 that is to be titled. In the figure, three rings are shown on each side of selenium band 170 and which accommodate web sizes, such as, 16 mm. 35 mm. and 70 mm. The purpose for arranging the rings on both sides of the band is so that titling may be recorded onto one or both edges of web 10 as desired. The two interior rings have an opening spacing of $3/10$ inch which corresponds to conventional 16 mm. film. The spacing for openings 172 in the remaining rings is $3/16$ inch, i.e., the normal spacing for conventional 35 mm. and 70 mm. film. In this case, a suitable circumference for drum 20 in order to accurately accommodate each of the different spacings is 30 inches. It should be noted, however, that the surface of cylindrical element 165 could be stepped up or down slightly to compensate for any variation in the spacing of sprocket openings 172 where conventional film sizes are not used or are for other than those listed. Thus, it is intended by the instant invention that drum 20 have the capability of interchangeably titling more than a single web size and, in particular, that it alternatively be able to accommodate 16 mm. 35 mm. and 70 mm. microfilm.

Figure 4:
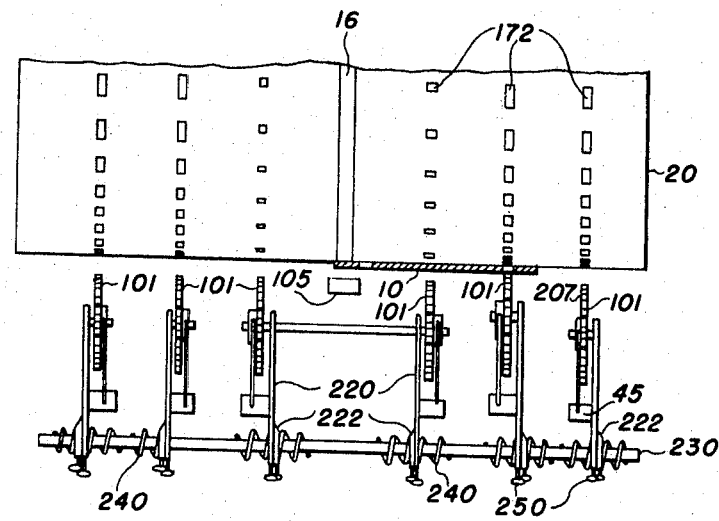
FIG. 4 is a front elevation view illustrating in greater detail certain portions of the apparatus of FIG. 1.
Figure 5:
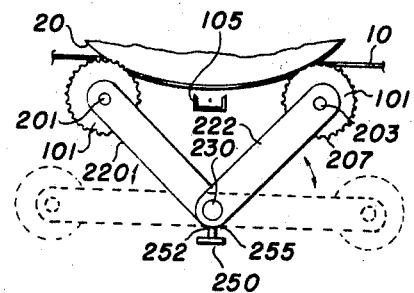
FIG. 5 is a side elevation view of the apparatus shown in FIG. 4.

The manner in which titling information is transferred from drum 20 onto web 10 is best shown in FIGS. 4 and 5. At the transfer station, web 10 is held in contact with recording drum 20 by a pair of sprocket members 101 which are rotatively mounted on parallel spaced apart idler shafts 201 and 203. Sprocket members 101 engage apertures 153 and openings 172 thereby holding the web in firm contact with recording drum 20 during advancement of the drum and the web. The rotative motion of drum 20 is imparted to sprocket members 101 which in turn drives web 10 past the transfer station.

Positioned below the sprocket member 101 mounted on idler shaft 201 is a switch 45 which is actuated by a depressable pin 205 in the rotation path of teeth 207 of sprocket member 101. The radial spacing between teeth 207 corresponds to the spacing between marking areas on web 10 as shown, for example, in FIGS. 2 and 2A whereby pulse circuit 42 is energized at the proper interval to record onto the prearranged marking areas. Alternatively, the sprocket actuated switch could provide pulses to a counter in the form of a divider circuit that would trigger pulse circuit 42 after predetermined counts which correspond to the desired frame spacing. Still another mode of operation for the pulse circuit is with a multilobe cam rotatively mounted on the same idler shaft 201 as sprocket member 101 to engage pin 205 with lobe pitch corresponding to the desired titling spacing along web 10. It can readily be appreciated that there can be neither longitudinal nor horizontal slippage of the web relative to the drum during recording since the teeth 207 of sprocket members 101 are at all times in engagement with both web 10 and sprocket openings 172 in the recording drum 20.

Idler shafts 201 and 203 are journaled in an end portion of support brackets 220 and 222, respectively. Support brackets 220 and 222 are rotatably supported at their opposite ends to a rod member 230. Rod member 230 extends along the entire length of drum 20 to provide support for multiple support brackets 220 and 222 and idler shafts 201 and 203 that are utilized for recording onto different size webs. Each bracket 220 supports a switch 45 and idler shaft 201 to which is secured a sprocket member 101. Similarly each bracket 222 supports an idler shaft 203 on which is mounted another sprocket member 101. Wound about rod member 211 is a coil spring 240 which serves to urge brackets 220 and 222 into a raised position where sprocket members 101 can engage web 10 and drum 20. Since there is only one set of support brackets 220 and 222 in recording position at any one time, a securing knob 250 is provided for locking the brackets in a rest position against the bias of coil spring 240. Each support bracket contains a threaded opening 252 for receiving a screw portion 245 of knob 241. The brackets are secured in a lowered position against the bias of coil spring 240 by engagement of the screw portion 252 with a flattened surface 255 on rod member 240 (see FIGURE 5).

From the above description there is disclosed novel apparatus for recording information onto sprocket apertured webs, such as, microfilm. Due to its unique construction, the recording drum is able to accommodate multiple size film widths. Furthermore, the photoconductive portion of the drum is relatively small and replaceable without requiring the renewal of the sprocketed drum. Of primary importance is that during recording, no horizontal or longitudinal slippage occurs from the exposure station to the transfer station. Thus, titling information may be recorded continuously and automatically onto prearranged marking areas on a web, such as, microfilm, without risking misalignment of the recorded information with the available marking area provided on the web.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. Recording apparatus for recording information in predefined marking areas on an apertured elongated web comprising:
    (a) drum means mounted for rotation and including a photoconductive layer extending about a circumferential portion thereof and containing peripheral uniformly spaced apart holes forming at least one ring axially spaced from and parallel to said layer;
    (b) first drive means for rotating said drum means and photoconductive layer past a series of xerographic processing stations: including an exposure station at which a previously charged photoconductive layer records a latent image of information to which it was exposed, a development station at which the latent image is developed, and a transfer station at which the developed image is transferred to a receiving web;
    (c) character generating means at the exposure station including a projectable information source serially chargeable, a flash lamp and a lens positioned to project the information from said source in a pattern of light and dark toward said moving photoconductive layer;
    (d) second drive means for advancing an elongated web containing predefined areas on which information is to be recorded and having uniformly spaced apart apertures corresponding to the spacing of the holes in at least one ring on said drum means past the transfer station in image transfer relation with said drum means with the apertures of the web in registry with the holes of said ring; and
    (e) circuit means responsive to the advance of said web to intermittently energize said flash lamp and serially charge the information of said source to effect recording of the information serially onto said predefined marking areas on said web.

2. Apparatus according to claim 1 wherein said second drive means includes at least one sprocket member rotatably journaled on a pivotal support, said support being movable from an operative position wherein said sprocket member is in engagement with said drum means and said web to an inoperative position out of engagement therewith.

3. Apparatus according to claim 2 wherein the peripheral holes in said drum for a plurality of rings axially spaced from and parallel to said photoconductive layer, each ring corresponding to a different web width and being adapted for engagement by at least one sprocket member of an associated drive means.

4. Apparatus according to claim 3 including a coil spring member for urging each support bracket of an associated drive means into the operative position and means for locking individual support brackets in the inoperative position against the bias of said spring member.

5. A xerographic recording drum comprising:
    a cylindrical member adapted for rotation about its axis;
    a peripheral photoconductive layer positioned intermediate the ends of said cylindrical member for rotation therewith; and
    a plurality of aperture rings formed in the cylindrical member axially spaced from and parallel to said photoconductive layer, each ring corresponding to a different size web on which a recording is to be made and adapted to receive a drive member operative therewith.

References Cited

UNITED STATES PATENTS 1,654,801    1/1928    Garbutt _____ 95—75

JOHN M. HORAN, *Primary Examiner.*

U.S. Cl. X.R.

95—1.7

UNITED STATES PATENT OFFICE
CERTIFICATE OF CORRECTION

Patent No. 3,437,020                                              April 8, 1969

Raymond T. Wright et al.

It is certified that error appears in the above identified patent and that said Letters Patent are hereby corrected as shown below:

In the drawings, sheet 1, Figure 1, the reference numeral "15 between members 137 and 138 should be -- 12 --. Reference numeral "30" adjacent reference numeral "39" should be -- 15 --. Column 2, lines 18, 39, 41, 48, the reference numeral "15", each occurrence, should read -- 30 --. Column 3, line 9, "developer" should read -- developed --. Column 4, line 16, "170" should read -- 16 --. Column 5, line 5, "211" should read -- 230 --; lines 13 and 1 "245" and "241" should read -- 255 -- and -- 250 --; lines 16 and 17, "252" and "240" should read -- 255 -- and -- 230 --; line 17, cancel "255". Column 6, line 2, "chargeable" should read -- changeable --; line 16, "charge" should read -- change --; line 27, "for" should read -- form --.

Signed and sealed this 29th day of December 1970.

(SEAL)
Attest:

EDWARD M. FLETCHER, JR.                            WILLIAM E. SCHUYLER, JR.
Attesting Officer                                            Commissioner of Patents